(12) United States Patent
Winchel et al.

(10) Patent No.: US 7,896,592 B1
(45) Date of Patent: Mar. 1, 2011

(54) ADJUSTABLE MOTORCYCLE SECURING DEVICE

(75) Inventors: Randy D. Winchel, Reedsburg, WI (US); Matthew D. Hillmer, Reedsburg, WI (US)

(73) Assignee: DRM Industries, Corp., Baraboo, WI (US)

( * ) Notice: Subject to any disclaimer, the term of this patent is extended or adjusted under 35 U.S.C. 154(b) by 427 days.

(21) Appl. No.: 12/184,720

(22) Filed: Aug. 1, 2008

Related U.S. Application Data (60) Provisional application No. 60/963,130, filed on Aug. 2, 2007.

(51) Int. Cl.
*B60P 7/08* (2006.01)
(52) U.S. Cl. .............................................. 410/3; 410/7
(58) Field of Classification Search ...................... 410/2, 410/3, 7, 80; 211/20, 22; 224/501, 552, 224/42.4, 553, 567, 924, 403; 248/503
See application file for complete search history.

(56) References Cited

U.S. PATENT DOCUMENTS

| | | | |
|---|---|---|---|
| 3,753,579 A | 8/1973 | Kurilich, Jr. | |
| D466,842 S | 12/2002 | Lems | |
| 6,802,493 B2 | 10/2004 | Lance | |
| 6,840,506 B2 | 1/2005 | Siivonen | |
| 7,198,443 B2 * | 4/2007 | Macomber, III | ............... 410/7 |
| 7,232,281 B2 | 6/2007 | Fullenkamp | |

* cited by examiner

*Primary Examiner*—Stephen Gordon
(74) *Attorney, Agent, or Firm*—Charles S. Sara, Esq.; Dewitt Ross & Stevens S.C.

(57) ABSTRACT

A device for securing a motorcycle to a surface such as a trailer bed includes a base assembly attached to the surface and including a base plate and a pair of eccentric pivot support brackets, a pin assembly, an eccentric pivot rotatably mounted to each of the eccentric pivot support brackets and having an aperture formed therein such that the height of the aperture is adjustable by rotating the eccentric pivot, and a pin bracket attached to a motorcycle. The motorcycle is secured to the surface by positioning the motorcycle with the attached pin bracket over the base assembly attached to the surface and using the pin assembly to connect the pin bracket to the apertures in the eccentric pivots. The rotatable eccentric pivots allow the device to be adjusted for use with motorcycles having various ride heights. Locking structures are provided for locking the rotational position of the eccentric pivots with respect to the eccentric pivot support brackets after such an adjustment is made.

17 Claims, 7 Drawing Sheets

ADJUSTABLE MOTORCYCLE SECURING DEVICE

This application claims the benefit of U.S. Provisional Patent Application No. 60/963,130 filed on Aug. 2, 2007.

FIELD OF THE INVENTION

The present invention is directed generally to vehicle accessories, in particular to vehicle accessories for two-wheeled vehicles, such as motorcycles, and, more specifically, to devices and methods for positioning and supporting vehicles on a surface, in particular to methods and devices such as stands for positioning and supporting a motorcycle on a surface, such as a surface of another vehicle for transportation of the motorcycle.

BACKGROUND OF THE INVENTION

Motorcycle owners are often faced with the need to transport their motorcycle on another vehicle, such as in a trailer or the back of a pick-up truck. For example, the motorcycle may be inoperable and need to be transported to a mechanic or other technician for repair. Also, motorcycle rallies and other gatherings of motorcycle enthusiasts have been growing in popularity. While most bikers would prefer to ride their bikes to such gatherings, for rallies that are far from the biker's home, the long distances and time away from home involved in such adventures make riding their bikes impractical for many. In such cases, the next best option is to transport the bike to the gathering, e.g., in a trailer pulled behind a truck, camper, or other vehicle.

Thus, there is a need to secure the motorcycle in a trailer or other vehicle so that the bike survives the journey without damage. The traditional approach to securing a motorcycle in a trailer or other vehicle has been to use rope or tie-down straps to tie the motorcycle to the transporting vehicle. But this traditional approach has many limitations. Most motorcycles do not come supplied with structures specifically for tying the bike down with ropes or straps. So the user must improvise to find appropriate places on the motorcycle frame or elsewhere to which the ropes and straps can be attached. Ropes and tie down straps can damage a motorcycle's expensive paint and chrome where the rope or strap comes in contact with the bike. Tying down a motorcycle with ropes and tie down straps can exert undue pressure on a motorcycle's suspension, thereby potentially damaging it. It typically takes more than one person to secure a motorcycle in a vehicle using ropes and straps. Ropes and straps strung between a motorcycle and the floor or wall of a trailer can be a tripping hazard. Ropes and straps can stretch and deteriorate or become damaged over time with use and exposure to the elements, thereby weakening them. Thus ropes and straps used to tie down a motorcycle require close and frequent inspection and periodic replacement. The ropes and straps must be stored between uses and often become tangled either in storage or in the process of tying down the motorcycle.

In response to the many limitations of the use of ropes or straps to secure a motorcycle in a trailer or other vehicle, various other types of motorcycle securing devices have been developed. These alternatives typically take the form of a stand that is secured in the trailer or other vehicle that is to transport the motorcycle, and to which the motorcycle, in turn, is attached for transportation.

An example of such a motorcycle stand is illustrated in U.S. Design Pat. No. D466,842. This motorcycle stand is designed to secure a motorcycle on a trailer, service lift, or other surface. The motorcycle stand includes an elongated base plate having two bracket plates extending upward therefrom. The base plate is secured to the floor of a trailer or other vehicle. The two bracket plates are separated from each other along the base plate and face each other and each have an aperture formed therein. An attachment bracket is secured to the frame of a motorcycle to be transported. The motorcycle is then positioned on the trailer over the base plate with the attachment bracket positioned between the bracket plates on the base plate. A rod or pin, having a handle on one end thereof, is extended through the apertures in the bracket plates and through corresponding apertures on the attachment bracket, thereby to secure the attachment bracket, and thus the motorcycle, to the base plate mounted on the trailer. The stand thus holds the motorcycle steady and upright in a trailer without the need for straps, ropes and wheel chocks.

Another, much more complicated, motorcycle transporting device of this type is described in U.S. Pat. No. 7,232,281. This motorcycle transporting device comprises a docking station mounted to a bed of a trailer, a docking bar receiver consisting of a pair of stationary brackets that can be permanently attached to the frame of a motorcycle, and a docking bar assembly, which, when in use, is inserted through the pair of stationary docking bar receiver brackets and secured with a securing pin. The docking station is comprised of a formed steel rectangular base that has attached at opposite ends a vertical receiver member. Holes are provided in the base for attaching it to the bed of a transport device. An automatic capture mechanism is assembled on each vertical receiver member. In use, the user secures the docking station to the bed of a transporting device, such as a trailer or pick-up truck. The user then secures the stationary docking bar receiver brackets to the frame of a motorcycle. This step is done only once, as the brackets are designed to be permanently installed. The user then mounts the docking bar assembly on the docking bar receiver stationary brackets using the securing pin. The user moves the motorcycle forward onto the docking station until the docking bar is guided into the vertical receiver member and is automatically captured by the capture mechanisms. The user then inserts securing pins or padlocks through corresponding holes in the vertical receiver members and rotating capture members of the capture mechanisms. The user then transports the motorcycle to the desired location. When the user desires to unload the motorcycle, the user first removes the securing pins or padlocks from the docking station. The user then boards the motorcycle and, when ready and in control, steps on a pedal section of rotating catch members of the capture mechanisms, which releases the rotating capture members and allows the motorcycle to be backed from the docking station. The user then removes the docking bar so as not to interfere with the safe operation of the motorcycle.

It is noted that both of the motorcycle stands just described are designed for the transportation of stock motorcycles that do not have modifications that will alter the original equipment manufacture ("O.E.M.") ride height. However, bikers often modify or customize their bikes in various ways that alter the ride height of the bike somewhat. Such modifications may, for example, alter the ride height of the motorcycle frame from the ground by only about one inch or less. But such a modification is enough to prevent the use of a stand that was designed to secure a motorcycle having a specific ride height to a trailer or other vehicle. What is desired, therefore, is a motorcycle stand or other device for securing a motorcycle to a trailer or other surface and that is adjustable to accommodate bikes of various ride heights.

U.S. Pat. No. 7,198,443 describes a motorcycle transport system including a crossbar that is inserted through a substantially horizontal hollow bore extending from one side to the other of a motorcycle, such as a hollow swing arm pivot bolt or rear axle. The crossbar has a removeable first end, a central portion, and a second end. The crossbar has a length greater than the bore and is small enough to pass through the bore with the removeable end removed. The first and second ends of the crossbar have caps. One or both caps may be removed such that the crossbar may be inserted through the bore. A crossbar attachment mechanism is coupled to one or both caps and preferably includes a disk-shaped member defining one or more apertures. A stand provides rigid support for the crossbar and connected motorcycle. The stand is bolted to a surface such as a truck or trailer bed supporting the motorcycle. The stand has a vertical support element and a stand attachment mechanism for attaching to the crossbar via the crossbar attachment mechanism. A base is rigidly attached to the vertical support element. The stand attachment mechanism includes a substantially horizontal member defining one or more apertures. The stand is secured to the crossbar by extending a lock through an aperture defined by the horizontal member of the stand and further through an aperture defined by the disk shaped member of the crossbar. Because the device is attachable to a motorcycle via insertion through a hollow swing arm pivot, hollow rear axle, or the like, and further because each of these may be at different heights on different models of motorcycle, the vertical position of the stand attachment mechanism may be adjustable. A telescoping structure of the vertical support element enables a desired height to be set by insertion of a pin. The vertical positioning instead may be accomplished by another mechanism, such as a pawl-and-ratchet, scissor-screw, hydraulic or compressed air cylinder, electric motor, or the like.

U.S. Pat. No. 3,753,579 describes a motorcycle utility trailer that includes means for connecting one or more motorcycles positioned thereon thereto. Each connecting means includes a pair of spaced posts which extend vertically upward from the trailer frame. The posts are adapted to be rigidly connected to the frame in such a manner that the height and spacing thereof is adjustable. A connecting means includes a horizontal member attached to the frame using bolts. The horizontal member has a vertical plate portion that may include a series or pattern of holes therein, adjacent the opposite ends thereof. Similarly, each of vertical posts includes a series or pattern of holes therein, adjacent the bottom thereof, the arrangement of holes in the vertical posts being the same as the arrangement of holes in the horizontal member. The posts may be connected to the opposite ends of the horizontal member by passing two or more bolts through holes in the vertical posts and the horizontal member at the desired position and securing such bolts with nuts. In this manner, both the spacing between and the height of each of the vertical posts may be readily adjusted to accommodate different sizes of motorcycles.

Thus, these patents describe attaching a motorcycle to a trailer using a motorcycle transportation stand that is vertically adjustable using a telescoping vertical support structure or using vertical support structures that may be repositioned by connecting the vertical support structure to the trailer by selecting from among different available hole patterns in a connecting means, in order to accommodate different models of motorcycles. What is desired, however, is a different method of height adjustment for a motorcycle securing device that allows for finer height adjustment to accommodate the modified ride height resulting from modification or customization of a stock motorcycle, rather than to accommodate different models of motorcycles, and which is both easy to use and does not compromise the secure attachment of a motorcycle to a trailer or other vehicle during transportation thereof.

U.S. Pat. Nos. 6,840,506 and 6,802,493 describe motorcycle stands that include telescoping vertical members that allow the height of the stand to be adjusted to accommodate different motorcycles and lift heights. These stands, however, are used to support and elevate a motorcycle for maintenance purposes, and are not appropriate for use in securing a motorcycle to a trailer or other vehicle for transportation thereof.

SUMMARY OF THE INVENTION

The present invention provides an adjustable motorcycle securing device in the form of a motorcycle stand that includes an adjustable height locking mechanism which allows for motorcycles with modified ride heights to utilize the motorcycle stand. In accordance with the present invention, height adjustment is achieved by means of an eccentric pivot structure, which is described in more detail below and is illustrated in the attached drawings.

An adjustable motorcycle securing device in accordance with the present invention includes a base assembly, a pin assembly, and a pin bracket. The base assembly is securely mounted to the bed of a trailer or other vehicle on which a motorcycle is to be transported. The eccentric pivot structure forms part of the base assembly and includes a rotatable disc mounted at each end of the base assembly and having a pin aperture formed therein. The pin aperture is adapted to receive the pin assembly and is formed through the rotatable discs at a position thereon offset from the center or axis of rotation thereof. Thus, by rotating the eccentric pivot structure discs, the elevation of the pin apertures with respect to the trailer bed is adjusted. A locking structure is provided to fix the rotatable discs in position in the base assembly once the desired pin aperture position is achieved. The pin bracket is mounted to the frame of a motorcycle using small unobtrusive clamps that are installed, and left in place, on the lower frame of a motorcycle, and includes pin bracket pin apertures that also are adapted to receive the pin assembly.

In use, the eccentric pivot structure on the base assembly is adjusted in the manner described such that the pin apertures in the eccentric pivot structure are aligned with the pin apertures in the pin bracket when the motorcycle is positioned over the base assembly. The pin assembly then may be inserted easily through the aligned pin apertures to secure the motorcycle to the base assembly, and thus to the trailer or other surface to which the base assembly is attached.

The height adjustment made possible by the eccentric pivot structure thus allows a single motorcycle securing device in accordance with the present invention to be used for motorcycles having various ride heights, e.g., resulting from the modification or customization of a stock motorcycle, or otherwise. The eccentric pivot structure of the present invention allows this height adjustment to be easily and accurately achieved and does not compromise the secure attachment of a motorcycle to a trailer or other vehicle for the safe transport thereof.

An adjustable motorcycle securing device in accordance with the present invention may be used to secure a motorcycle on any surface, such as a trailer or other vehicle, on a service lift, or in a garage. However, although there are numerous applications, an adjustable motorcycle securing device in accordance with the present invention is primarily intended to hold a motorcycle steady and upright in a trailer or other vehicle without the need for straps, ropes, or wheel chocks.

An adjustable motorcycle securing device in accordance with the present invention holds a bike more securely than straps, without risk of damage to the suspension that can result when a bike is pulled down with straps, or tripping on tie downs.

Other objects, features, and advantages of the invention will appear more fully from the following detailed description of the preferred embodiment of the invention made in conjunction with the accompanying drawings.

DETAILED DESCRIPTION OF THE INVENTION

Figure 1:
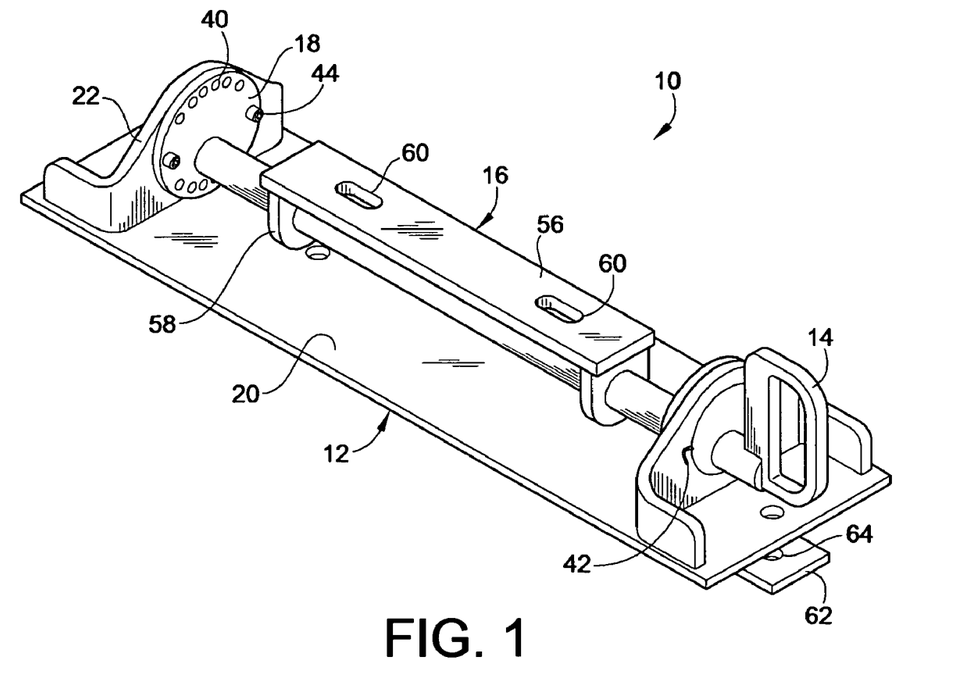
FIG. 1 is a perspective view of an exemplary embodiment of a motorcycle securing device in accordance with the present invention in the form of a motorcycle stand having a locking eccentric pivot mechanism for height adjustment in accordance with the present invention.
Figure 2A:
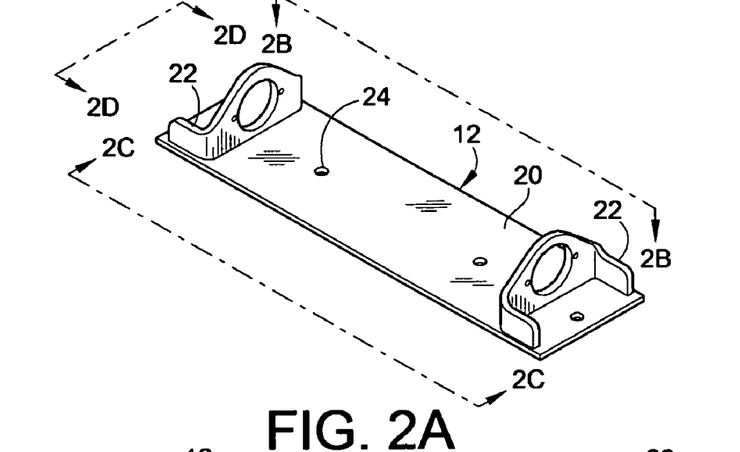
FIG. 2A is a perspective view illustration of an exemplary base assembly for a motorcycle securing device in accordance with the present invention.
Figure 2B:
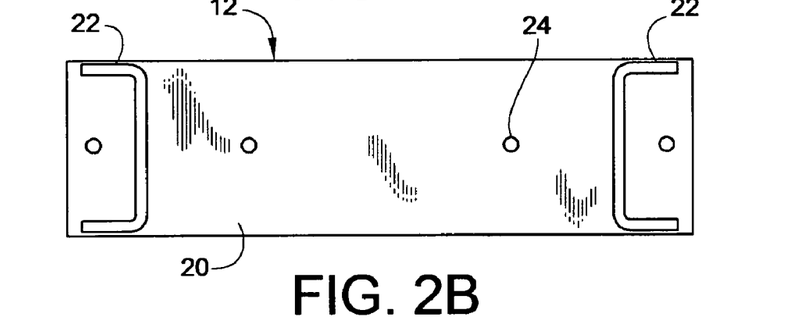
FIG. 2B is a top view of the exemplary base assembly of FIG. 2A, as taken along line 2B-2B thereof.
Figure 2C:
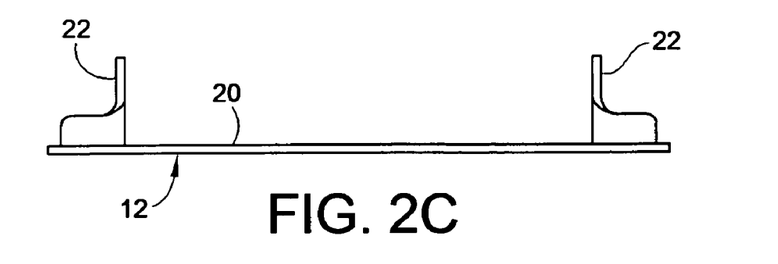
FIG. 2C is a side view of the exemplary base assembly of FIG. 2A, as taken along line 2C-2C thereof.
Figure 2D:
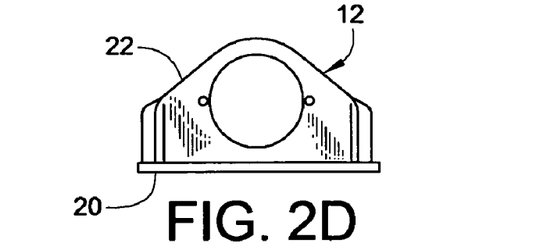
FIG. 2D is an end view of the exemplary base assembly of FIG. 2A, as taken along line 2D-2D thereof.

The present invention will now be described in detail with reference to an exemplary adjustable motorcycle securing device 10 in accordance with the present invention, as illustrated in FIG. 1. The three main components of a motorcycle securing device 10 in accordance with the present invention include a base assembly 12, a pin assembly 14, and a pin bracket 16. In accordance with the present invention, a locking eccentric pivot structure 18 is rotatably mounted on and as part of the base assembly 12. As will be discussed in more detail below, the eccentric pivot structure 18 allows for a motorcycle securing device 10 in accordance with the present invention to be adjusted easily to accommodate motorcycles having different ride heights. Each of the components mentioned above will now be described in more detail.

With reference to FIGS. 2A-2D, an exemplary base assembly 12 in accordance with the present invention includes a base plate 20 to which two eccentric pivot support brackets 22 are attached.

Figure 3A:
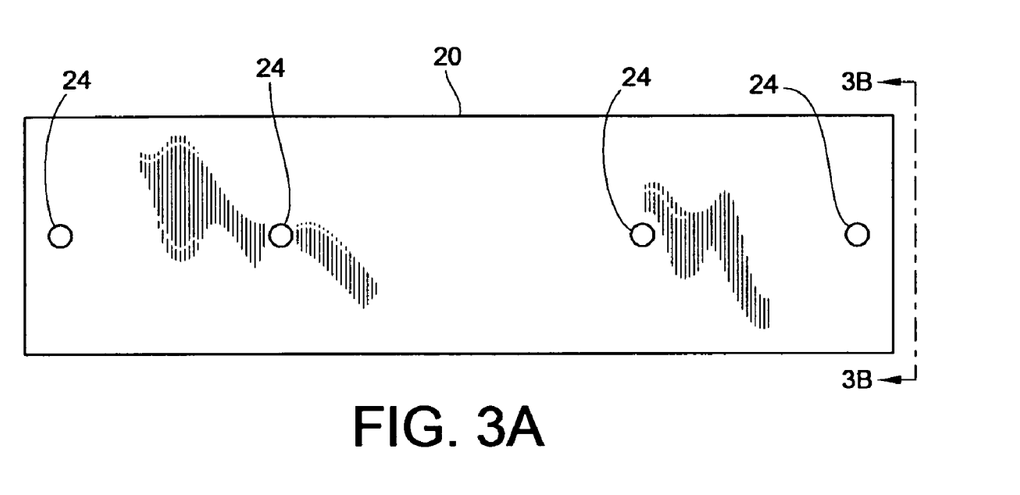
FIG. 3A is a top plan view of an exemplary base plate portion of the base assembly of a motorcycle securing device in accordance with the present invention.
Figure 3B:
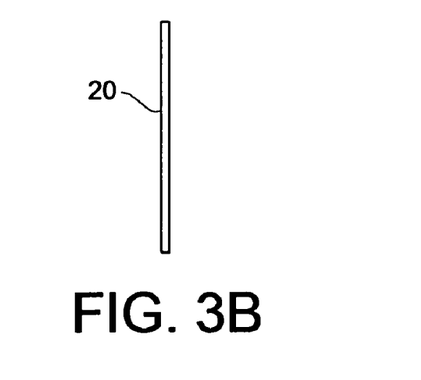
FIG. 3B is a side view of the exemplary base plate of FIG. 3A, as taken along line 3B-3B thereof

With reference to FIGS. 3A and 3B, the base plate 20 may be implemented as a generally rectangular plate made of an appropriate material and having sufficient thickness to support securely a motorcycle during transport thereof when the base plate 20 is attached to the bed of a trailer or another vehicle. For example, the base plate 20 may be cut or punched from ¼ inch thick steel, although another material, thickness, and manufacturing process may also be found to be appropriate. The length and width of the base plate 20 may be selected as appropriate to provide support for the eccentric pivot support brackets 22 attached thereto with sufficient space for a motorcycle to be positioned therebetween. For exemplary purposes only, the base plate 20 may be made sufficiently long to provide for approximately 18 inches between the eccentric pivot support brackets 22 attached thereto. Other dimensions may also, however, be found to be appropriate. Fastener apertures 24 are drilled or otherwise formed through the base plate 20 to facilitate attachment of the base plate 20 to a surface, such as the bed of a trailer or other vehicle, using bolts or other fasteners. Although four such fastener apertures 24 are illustrated for example in the figures, more or fewer fastener apertures 24 may be provided through the base plate 20.

Figure 4A:
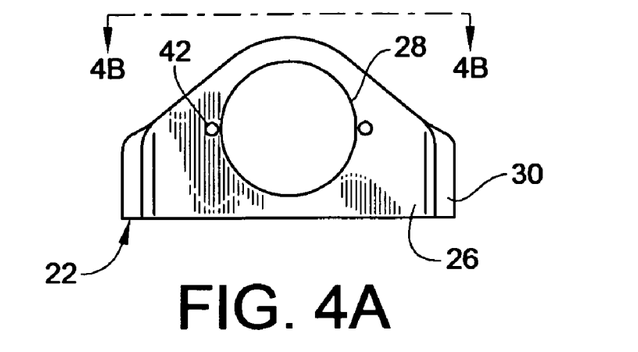
FIG. 4A is a side view of an exemplary eccentric pivot support bracket portion of the base assembly of a motorcycle securing device in accordance with the present invention.
Figure 4B:
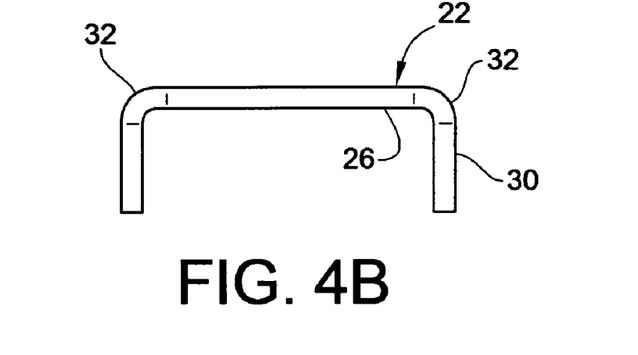
FIG. 4B is a top view of the exemplary eccentric pivot support bracket of FIG. 4A, as taken along line 4B-4B thereof.

With reference to FIGS. 4A and 4B, each of the eccentric pivot support brackets 22 may preferably feature a vertical plate portion 26. When attached to the base plate 20, at or near the opposite ends thereof, the vertical plate portions 26 of the eccentric pivot support brackets 22 extended vertically upward from the base plate 20 perpendicular thereto and face each other in parallel across the length of the base plate 20. Each of the eccentric pivot support brackets 22 has an eccentric pivot mounting aperture 28 formed in the vertical plate portion 26 thereof. The eccentric pivot mounting aperture 28 is preferably circular, and, as will be discussed in more detail below, is designed to support a locking eccentric pivot 18 for rotational movement therein. Support legs 30 may be formed to extend perpendicularly from each side of the vertical plate portion 26 of the eccentric pivot support bracket 22 and to be positioned perpendicularly to the base plate 20 when the eccentric pivot support bracket 22 is attached thereto.

Figure 5A:
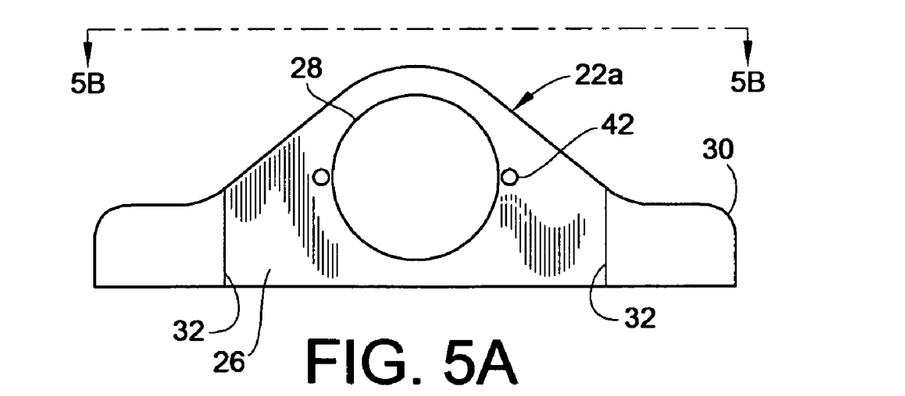
FIG. 5A is a side view of the exemplary eccentric pivot support bracket of FIG. 4A shown at an intermediate stage in the fabrication thereof.
Figure 5B:
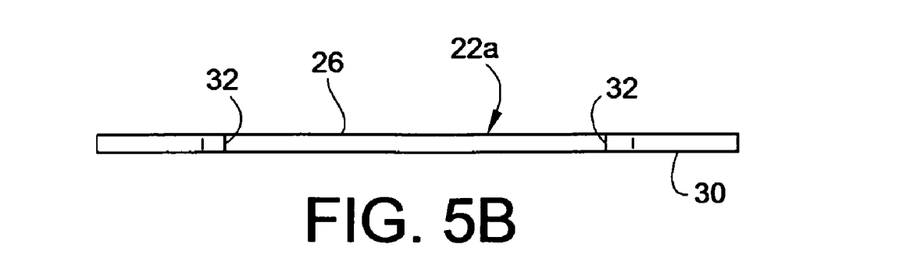
FIG. 5B is a top view of the eccentric pivot support bracket of FIG. 5A, as taken along line 5B-5B thereof.

Like the base plate 20, the eccentric pivot support brackets 22 may be made of an appropriate material having sufficient thickness to support securely a motorcycle during transport thereof when the support brackets are attached to the base plate 20. For example, the eccentric pivot support brackets 22 may be made from ⅜ inch thick steel material. As illustrated in FIGS. 5A and 5B, the eccentric pivot support brackets 22 may be made from ⅜ inch, or other thickness, steel by cutting or punching a form 22a of the eccentric pivot support bracket 22 from flat sheet material of this type. Note that the overall shape of the eccentric pivot support brackets 22 may be selected to have rounded upper edges, as shown, for safety, to prevent snagging clothes, etc., as well as for aesthetic reasons, although any other appropriate overall shape that satisfies the function to be performed by the eccentric pivot support brackets 22 may be used. The eccentric pivot mounting hole 28 is preferably also formed, e.g., by cutting or punching through the sheet material, at this time. The flat form 22a of the eccentric pivot support bracket 22 may then be bent, in a conventional manner, at appropriate bend points 32, to form the support legs 30 at right angles to the vertical plate portion 26 of the eccentric pivot support bracket 22.

Returning now to FIGS. 2A-2D, having formed the eccentric pivot support brackets 22 in the manner described, the eccentric pivot support brackets 22 may be attached to the top surface of the base plate 20 in a conventional manner. For example, steel eccentric pivot support brackets 22 may be welded to the base plate 20, at or near either end of the top surface of the steel base plate 20, along the bottom edges of both the vertical plate portion 26 and the support legs 30 of the eccentric pivot support brackets 22. Thus, the support legs 30 provide additional support for the vertical plate portion 26 of the eccentric pivot support bracket 22 to ensure that the vertical plate portion 26 of the eccentric pivot support bracket 22 remains attached and perpendicular to the top surface of the base plate 20. As illustrated in FIGS. 2A-2D, the eccentric pivot support brackets 22 preferably are mounted on the top surface of the base plate 20 such that the vertical plate portions 26 thereof face each other along the top surface of the base plate 20, with the support legs 30 of each eccentric pivot support bracket 22 extending in the direction away from the other eccentric pivot support bracket 22. As mentioned above, the eccentric pivot support brackets 22 are mounted on the base plate 20 with sufficient distance between the vertical plate portions 26 thereof for a motorcycle to be positioned therebetween, e.g., 18 inches apart, or any other appropriate distance.

Figure 6A:
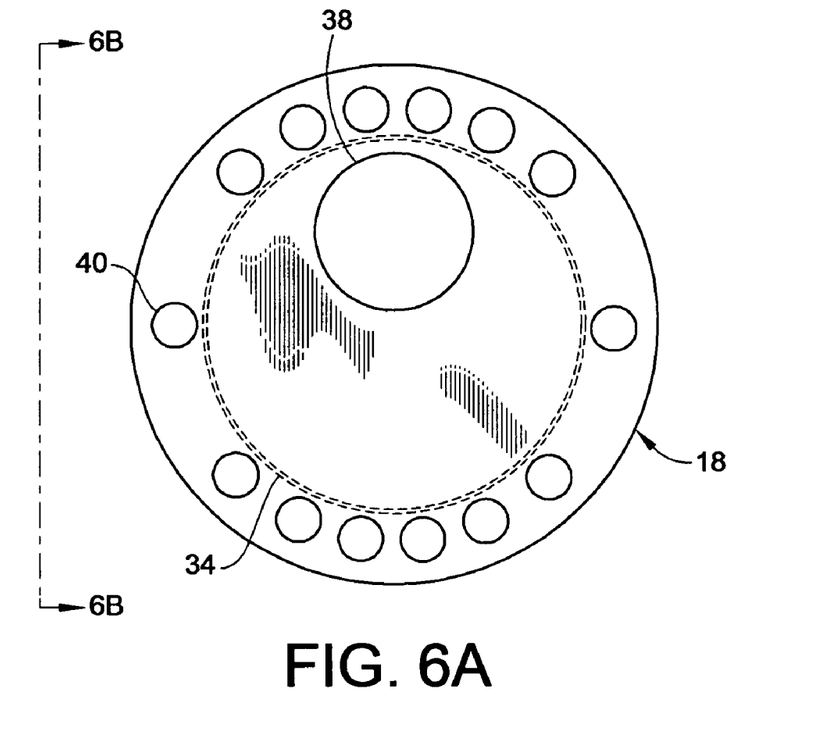
FIG. 6A is a front view of an exemplary eccentric pivot disc portion of the base assembly of a motorcycle securing device in accordance with the present invention.
Figure 6B:
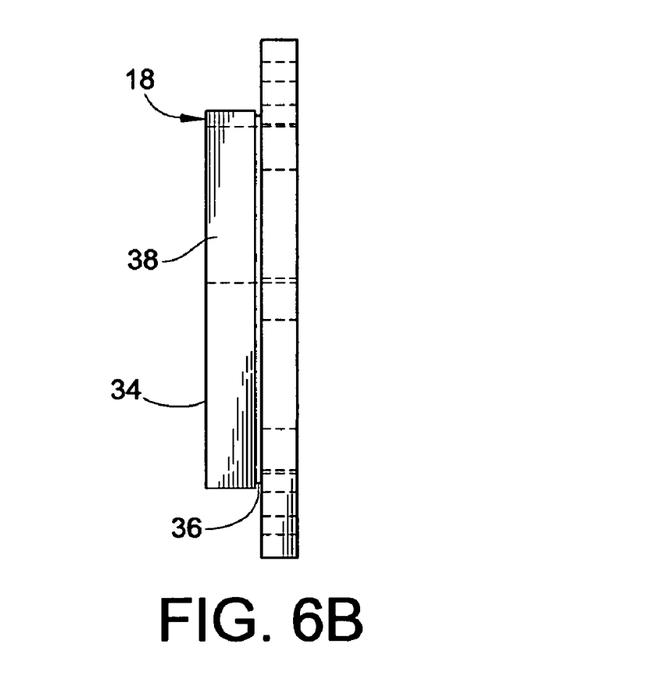
FIG. 6B is a side view of the exemplary eccentric pivot disc of FIG. 6A, as taken along line 6B-6B thereof.

With reference to FIGS. 6A and 6B, the eccentric pivot 18 preferably is disc shaped and includes a collar portion 34. The collar portion 34 is coaxial with but has a smaller diameter than the eccentric pivot disc 18 as a whole. The collar portion 34 is sized and shaped to be positioned in the eccentric pivot mounting aperture 28 of the eccentric pivot support bracket 22 for rotational movement therein. Thus, the diameter of the collar portion 34 of the eccentric pivot 18 preferably is only slightly smaller than the diameter of the eccentric pivot mounting aperture 28. For exemplary purposes only, if the diameter of the collar portion 34 is selected to be 2.5 inches, the diameter of the eccentric pivot mounting aperture 28 may be selected to be 2.505 inches. This will provide a good fit, allowing the eccentric pivot disc 18 to remain securely mounted to the eccentric pivot support bracket 22 by positioning the collar portion 34 of the eccentric pivot 18 in the mounting aperture 28, while allowing for the rotational movement of the eccentric pivot disc 18 with respect to the eccentric pivot support bracket 22. A slight undercut 36 at the junction of the collar portion 34 with the larger diameter portion of the eccentric pivot disc 18 may be provided to facilitate further this rotatable mounting of the eccentric pivot 18 to the eccentric pivot support bracket 22.

A pin assembly support aperture 38 is formed extending in an axial direction through the eccentric pivot disc 18, including through the collar portion 34 thereof. The pin assembly support aperture 38 preferably may be circular, as illustrated, or may have another desired shape. The pin assembly support aperture 38 is formed through the eccentric pivot disc 18 at a position thereon that is displaced from the axis of rotation of the eccentric pivot disc 18. Thus, with the eccentric pivot disc 18 mounted in an eccentric pivot support bracket 22 mounted to a base plate 20 in the manner described above, as the eccentric pivot 18 is rotated in the eccentric pivot mounting aperture 28 the position of the pin assembly support aperture 38 with respect to the base plate 20, and thus with respect to a surface to which the base plate 20 is mounted, is changed. As will be discussed in more detail below, the pin assembly support aperture 38 is sized and shaped to support a pin assembly 14 for attaching a motorcycle to the base assembly 12 via the pin bracket 16 attached to the motorcycle. By the use of a rotatable eccentric pivot 18 with offset pin assembly support aperture 38 in accordance with the present invention, the connecting position for the base assembly 12 can be raised or lowered as needed to match that of the pin bracket 16 attached to the motorcycle, in order to accommodate motorcycles having different ride heights.

In accordance with the present invention, a locking structure is provided to lock the eccentric pivot 18 in a desired rotational position with respect to the pivot support bracket 22 on which the eccentric pivot 18 is mounted. This locking structure preferably may be implemented by providing a series of locking apertures 40 extending through the eccentric pivot 18 in the axial direction and positioned around the periphery thereof (such that the locking apertures 40 do not extend through the collar portion 34 of the eccentric pivot disc 18). One or more (preferably at least two) corresponding locking apertures, e.g., threaded locking apertures 42, are formed in the eccentric pivot support bracket 22 adjacent the eccentric pivot mounting aperture 28 (see FIG. 4A) such that as the eccentric pivot 18 is rotated to change the position of the pin assembly support aperture 38 different ones of the locking apertures 40 extending through the eccentric pivot 18 are aligned with the locking apertures 42 in the eccentric pivot support bracket 22. The rotational position of the eccentric pivot 18 with respect to the eccentric pivot support bracket 22 may be locked by extending a fastener, e.g., a hex nut 44 (see FIG. 1) or any other appropriate fastener, through the locking apertures 40 on the eccentric pivot 18 into the aligned threaded locking apertures 42 in the eccentric pivot support bracket 22, thereby to secure the eccentric pivot 18 in position with respect to the support bracket 22.

The eccentric pivot 18 may be made from any appropriate material and by any appropriate manufacturing process. For example, the eccentric pivot 18 may be machined from steel shafting material in a conventional manner, with the pin assembly support aperture 38 and the locking apertures 40 drilled or otherwise cut therethrough. A coating material, e.g., a clear zinc coating, may also preferably be applied to the eccentric pivot 18.

Figure 7A:
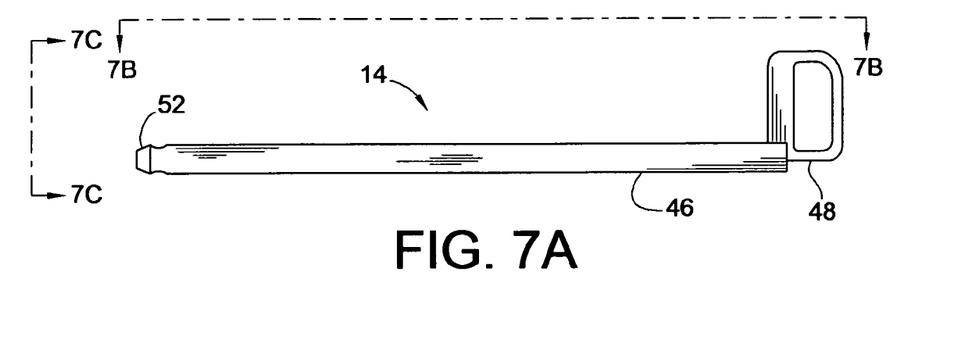
FIG. 7A is a side view of an exemplary pin assembly for a motorcycle securing device in accordance with the present invention.
Figure 7B:
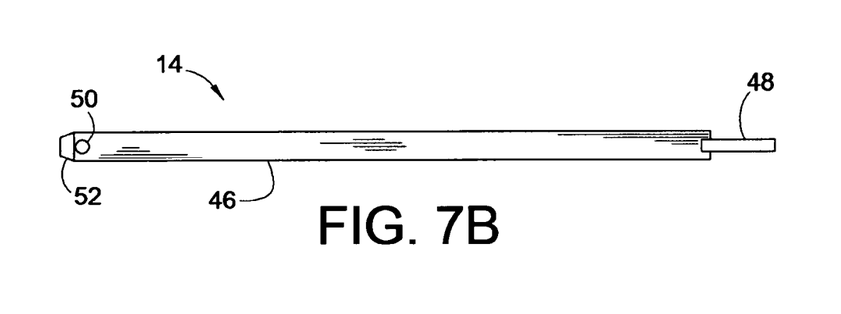
FIG. 7B is a top view of the exemplary pin assembly of FIG. 7A, as taken along line 7B-7B thereof.
Figure 7C:
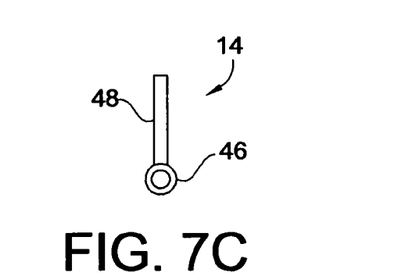
FIG. 7C is an end view of the exemplary pin assembly of FIG. 7A, as taken along line 7C-7C thereof.

With reference to FIGS. 7A-7C, the pin assembly 14 preferably includes an elongated pin 46 with a handle structure 48 attached to one end thereof. The cross sectional shape of the pin 46 preferably may be circular, as illustrated, but in any case preferably corresponds to the shape of the pin assembly support aperture 38 in the eccentric pivot 18, in which the pin 46 is to be mounted. The length of the pin 46 should be sufficient to extend between the pin assembly support apertures 38 in the eccentric pivots 18 mounted in the eccentric pivot supports 22 in the base assembly 12, such that when the pin 46 is extended through the pin assembly support apertures 38, with the handle portion 48 adjacent one of the eccentric pivot supports 22, a portion of the pin 46 extends entirely through and slightly beyond the vertical plate portion 26 of the other eccentric pivot support 22. A pin lock aperture 50 preferably is formed extending entirely through the pin 46 perpendicular to the axis thereof and at the end thereof opposite the handle 48 so as to be located in this extending portion of the pin 46. The pin lock aperture 50 is adapted to receive a pin lock structure (not shown), such as a cotter pin, pad lock, etc., such that the pin assembly 14 may be locked in position with the eccentric pivots 18 positioned between the handle 48 at one end of the pin 46 and the pin lock structure at the other end of the pin 46. This end of the pin 46, opposite the handle 48, preferably may be tapered 52 somewhat, to facilitate insertion of the pin 46 through the pin assembly support apertures 38. The pin 46 may be formed of a solid rod or a tubular material of sufficient strength to support a motorcycle in transport that is attached to an adjustable motor cycle securing device 10 in accordance with the present invention. The pin 46 may be cut and/or otherwise shaped or fabricated from such material in a conventional manner.

Figure 8A:
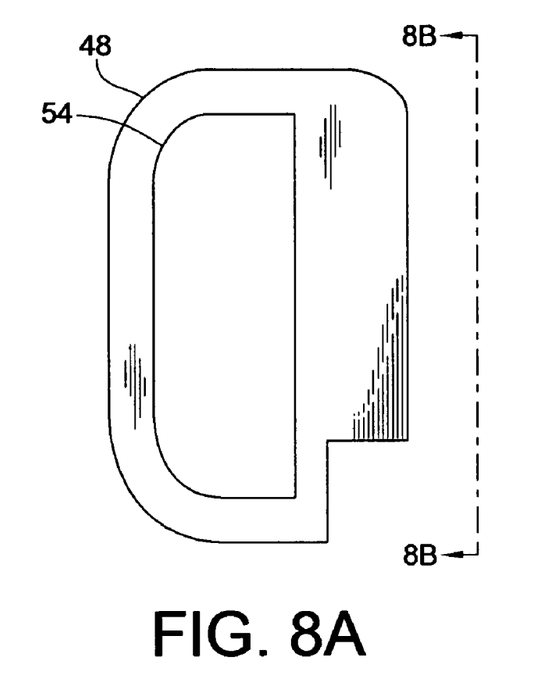
FIG. 8A is a side view of an exemplary pin handle portion of the pin assembly of FIG. 7A.
Figure 8B:
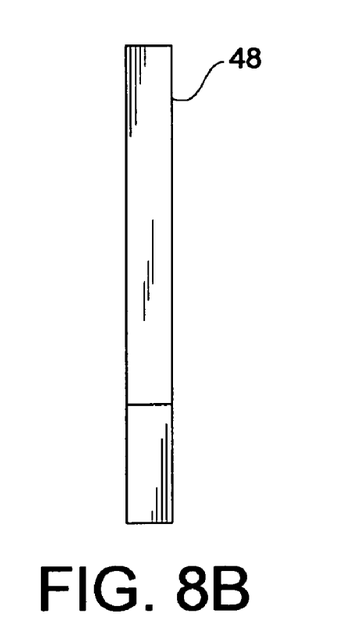
FIG. 8B is an end view of the exemplary pin handle portion of FIG. 8A, as taken along line 8B-8B thereof.

With respect to FIGS. 8A and 8B, the handle portion 48 of the pin assembly 14 is shown in more detail. The handle 48 may be formed of any desired and appropriate material, by any desired and appropriate manufacturing process, and attached to the end of the pin 46 in any desired and appropriate manner. For example, the handle 48 may be formed of a sheet metal material that is cut or punched to form a handle opening 54 therethrough and which is welded to the end of the pin 46.

Returning again to FIG. 1, the pin bracket 16 preferably may include a pin bracket plate 56 with at least one, and preferably two, pin bracket pin supports 58. The pin bracket plate 56 may be of any desired length that is less than the distance between the eccentric pivots 18 of the securing device 10. The pin bracket pin supports 58 are attached to the pin bracket plate 56 and are adapted to receive the pin assembly 14 such that the pin bracket 16 is supported by the pin assembly 14. For example, the pin bracket pin supports 58 may be formed as plates having central apertures formed therein and that are attached to the pin bracket plate 56 so as to extend downward therefrom at right angles thereto, with the pin bracket pin supports 58 positioned at each end of the pin bracket plate 56 and with the central apertures of the pin bracket pin supports 58 aligned. The pin bracket plate 56 and pin supports 58 may be made by conventional manufacturing processes of any desired material of sufficient strength to support a motorcycle in transport that is attached thereby to a securing device 10 in accordance with the present invention. For example, the pin bracket plate 56 and pin supports 58 may be formed by cutting and/or stamping from steel plate material, with the pin supports 58 thus formed welded at each end of the pin bracket plate 56 in the manner described above.

The pin bracket plate 56 preferably includes one or more mounting structures, such as fastener apertures 60, formed therein or thereon, whereby the pin bracket plate 56, and thus the pin bracket 16, may be mounted on a motorcycle that is to be transported or otherwise supported using a securing device 10 in accordance with the present invention. For example, frame clamps (not shown) may be fixedly attached to the frame of a motorcycle whereby the pin bracket 16 may mounted on to the motorcycle frame via appropriate fasteners extending through the fastener apertures 60 in the pin bracket plate 56 and into the frame clamps attached to the motorcycle. Different styles of frame clamps may be required for attachment of the pin bracket 16 to different types or models of motorcycles. However, any motorcycle equipped with the appropriate frame clamps may be used with the same pin bracket 16 and thus may be secured to anything with a corresponding base assembly 12 attached to it. If a user has several motorcycles, any of them can be attached to a trailer or lift or other surface as long as they are equipped with the appropriate frame clamps. If a user already has a securing device 10 in accordance with the present invention, the user can simply install appropriate frame clamps on one or more other motorcycles, in order to make the other bikes ready to use with that securing device 10. Thus, preferably extra frame clamp assemblies for various different types or models of motorcycles are made available separately from the securing device 10 itself.

An exemplary method for using the exemplary securing device 10 in accordance with the present invention and described above to secure a motorcycle to a trailer for transport thereon will now be presented. It should be understood, however, that a securing device 10 in accordance with the present invention may be used to a secure a motorcycle to various surfaces other than trailer beds and for applications other than motorcycle transport. Thus, rather than to a trailer, the base assembly 12 of a securing device 10 in accordance with the present invention may be attached, for example, to a lift, or to a garage floor.

To summarize the method described below, the base assembly 12 is attached securely to a trailer bed. Frame clamps are attached to the frame of the motorcycle to be transported. The pin bracket 16 attaches to the clamps on the frame in minutes when the user wants to put the bike on the trailer for transport. The base assembly 12 is adjusted by use of the eccentric pivots 18 to accommodate the ride height of the bike to be transported. The bike is attached to the base assembly 12 by the means of the pin assembly 14 extending through the base assembly 12 and the pin bracket 16. The pin bracket 16 is removed easily from the motorcycle when it is time to go for a ride. (The bike should not be ridden with the pin bracket 16 in place on the motorcycle. The pin bracket 16 must be removed when the motorcycle comes out of the base assembly 12.)

Frame clamps are attached securely to the frame of a motorcycle to be transported using the securing device 10 in accordance with the present invention. This procedure need only be performed once per motorcycle. As discussed above, the frame clamps provide a structure whereby the pin bracket 16 is attached securely to a motorcycle. Attaching the frame clamps to the motorcycle frame may require loosening the clamps that hold wires to the motorcycle frame in some applications. The frame clamps preferably are installed initially on the motorcycle frame snug, but not tight. The pin bracket 16 is then mounted securely to the frame clamps in the usual manner. This will level the frame clamps. The pin bracket 16 may then be removed and the frame clamps tightened in position on the motorcycle frame.

The base assembly 12 is attached securely to a trailer bed. This operation is performed only once, although the base assembly 12 may later be removed from the trailer bed and mounted in another trailer or on another surface. An appropriate position for the base assembly 12 in the trailer must first be selected. It is best to position the motorcycle in the trailer to ensure adequate clearance between the bike handlebars and the wall of the trailer, additional motorcycles, trailer doors, etc. Position the bike in the trailer in the selected desired position for transport. Slide the base assembly 12 under the bike and insert the pin assembly 14 pin 46. Make sure the base assembly 12 is positioned square in relation to the trailer, this will prevent complications when later loading and unloading bikes. Check around for bike clearance issues with walls, other bikes, wheel wells, etc. Then measure and note the position of the base assembly 12 in the trailer. Check under the trailer for clearance issues, such as interference with cross members and wiring, etc. Remove the bike from the trailer. Re-measure the position of the base assembly 12 to ensure it has not moved and that the base is squarely placed. Mark the trailer floor around the base assembly 12 to ensure that the base stays square and does not slide from position while drilling. Using the base assembly 12 as a guide, drill a hole in the trailer bed at a mounting aperture 24 on one end of the base assembly 12 while placing one foot on the middle of the base plate 20 to prevent it from moving. Insert a bolt into the drilled hole, this will keep the base assembly 12 stationary while drilling a second hole. Drill a hole in the trailer bed at a mounting aperture 24 on the opposite end of the base assembly 12 while placing one foot on the base plate 20 to prevent it from moving. Insert a bolt into the second hole drilled, this will ensure that all holes will be lined up correctly. Drill the two remaining holes corresponding to the remaining mounting apertures 24 and insert bolts. Place a floor mounting plate (support bar) 62 (see FIG. 1) into position under the trailer such that the ends of the bolts positioned in the trailer bed extend through corresponding apertures 64 formed in the floor mounting plate 62. Thread locking nuts onto the bolts to hold the floor mounting plate 62 in position. Tighten the hardware to complete the installation of the base assembly 12. Recommended hardware for this installation includes ½" Nylon Locking Nuts and ½" Grade 5 hex head bolts. The bolt length should be 1⅛" plus the trailer floor thickness such that approximately ½" of thread is showing after tightening the nuts to 78 ft-lbs.

To attach a motorcycle to the securing device 10 for transportation the pin bracket 16 is first attached to the frame clamps mounted on the motorcycle frame, e.g., using fasteners, such as hex bolts, extending through the mounting apertures 60 in the pin bracket 16 and into the frame clamps. Then the motorcycle is positioned squarely and centered over the base assembly 12 mounted on the trailer bed such that the pin bracket 16 is positioned between the eccentric pivot support brackets 22 with the pin assembly support apertures 38 in the eccentric pivots 18 aligned with the apertures in the pin bracket pin supports 58. The position of the pin assembly support apertures 38 may need to be adjusted to achieve this alignment depending on the ride height of the bike, which may be different from a stock bike due, for example, to user modification and customization. The motorcycle securing device 10 of the present invention allows for such varying height adjustment. The eccentric design of the pin assembly support apertures 38 on the eccentric pivots 18 allows an opening for the pin assembly 14 to be placed and rotated in an eccentric manner. This creates, for example, at least a 1.25-inch adjustability to accommodate a range of motorcycles and ride heights. The eccentric pivot 18 is rotated to the desired position for the desired ride height and secured in position by locking fasteners 44, such as screws, preferably Allen head screws, positioned within the appropriate locking apertures 40 in the eccentric pivot 18. In this manner, the eccentric pivot 18 is held in place once the desired height is established. The pin assembly 14 is then slid through the base assembly 12 and the pin bracket 16. The pin may be slid into place while the user is seated on the motorcycle. It is not necessary to have a second person assist with pin insertion. If, after adjusting for the appropriate ride height as discussed above, the corresponding apertures on the base assembly 12 and the pin bracket 16 do not line up perfectly, it means that the motorcycle is not straight on the base assembly 12. Turning the handlebars left or right will move the motorcycle horizontally to allow the pin assembly 14 to slide into position. A locking device, e.g., a cotter pin or padlock, is inserted through the pin lock aperture 50 to lock the pin assembly 14 in place. The use of a padlock provides for added security, in this case effectively locking the motorcycle to the trailer bed.

To remove a motorcycle from the securing device 10 the locking device is removed from the pin lock aperture 50 and the pin assembly 14 is removed. The pin assembly 14 may be removed by a user seated on the motorcycle. The motorcycle is then rolled away from the base assembly 12. The pin bracket 16 is removed from the motorcycle before riding. (The motorcycle should not be ridden with the pin bracket 16 in place for any reason.)

The various components of an adjustable securing device 10 in accordance with the present invention may be either powder coated or anodized for a durable and attractive finish.

It is understood that the invention is not confined to the particular construction and arrangement of parts herein illustrated and described, but embraces such modified forms thereof as come within the scope of the following claims.

What is claimed is:

1. A securing device for attaching a motorcycle to a surface, comprising:
    a. a base assembly including a base plate and a pair of eccentric pivot support brackets attached to the base plate;
    b. a pin assembly including a pin and a pin handle attached at a first end of the pin;
    c. an eccentric pivot disk rotatably mounted on each eccentric pivot support bracket and having a pin assembly support aperture adapted to receive the pin formed therethrough at a position thereon displaced from a rotational axis of the eccentric pivot disk such that a distance of the pin assembly aperture from the base plate is adjustable by rotation of the eccentric pivot disk; and
    d. a pin bracket adapted to be attached to a motorcycle and to receive the pin assembly.

2. The securing device of claim 1 wherein the base plate includes a plurality of apertures formed therethrough for attaching the base assembly to the surface via the base plate using fasteners.

3. The securing device of claim 1 wherein the pin assembly includes a pin lock aperture formed through the pin at a second end thereof opposite the first end of the pin and adapted to receive a pin lock structure for locking the pin assembly in place when the pin is received in the pin assembly support aperture and the pin assembly is received by the pin bracket.

4. The securing device of claim 1 wherein the eccentric pivot disks include additionally a plurality of locking apertures formed extending through the eccentric pivot disks at the periphery thereof and wherein the eccentric pivot support brackets include at least one corresponding locking aperture formed therein and positioned thereon such that the eccentric pivot disk is lockable in a selected rotational position by extending a fastener through a selected one of the locking apertures formed in the eccentric pivot disk into the corresponding locking aperture formed in the eccentric pivot support bracket.

5. The securing device of claim 1 wherein the pin bracket includes a pin bracket plate adapted to be attached to a motorcycle and a pin bracket pin support attached to the pin bracket plate and having an aperture formed therethrough adapted to receive the pin.

6. The securing device of claim 5 wherein the pin bracket plate includes a plurality of fastener apertures formed therethough and adapted to receive fasteners for attaching the pin bracket to frame clamps attached to a frame of a motorcycle.

7. A securing device for attaching a motorcycle to a surface, comprising:
    a. a base assembly including a base plate and a pair of eccentric pivot support brackets attached to the base plate, wherein each eccentric pivot support bracket includes a locking aperture formed therein;
    b. a pin assembly including a pin and a pin handle attached at a first end of the pin;
    c. an eccentric pivot disk rotatably mounted on each eccentric pivot support bracket and including
        i. a pin assembly support aperture adapted to receive the pin and formed therethrough at a position thereon displaced from a rotational axis of the eccentric pivot disk such that a distance of the pin assembly aperture from the base plate is adjustable by rotation of the eccentric pivot disk; and ii. a plurality of locking apertures formed extending through the eccentric pivot disk at the periphery thereof such that the eccentric pivot disk is lockable in a selected rotational position by extending a fastener through a selected one of the locking apertures formed in the eccentric pivot disk into the locking aperture formed in the eccentric pivot support bracket; and d. a pin bracket adapted to be attached to a motorcycle and to receive the pin assembly.

8. The securing device of claim 7 wherein the base plate includes a plurality of apertures formed therethrough for attaching the base assembly to the surface via the base plate using fasteners.

9. The securing device of claim 7 wherein the pin assembly includes a pin lock aperture formed through the pin at a second end thereof opposite the first end of the pin and adapted to receive a pin lock structure for locking the pin assembly in place when the pin is received in the pin assembly support aperture and the pin assembly is received by the pin bracket.

10. The securing device of claim 7 wherein the pin bracket includes a pin bracket plate adapted to be attached to a motorcycle and a pin bracket pin support attached to the pin bracket plate and having an aperture formed therethrough adapted to receive the pin.

11. The securing device of claim 10 wherein the pin bracket plate includes a plurality of fastener apertures formed therethough and adapted to receive fasteners for attaching the pin bracket to frame clamps attached to a frame of a motorcycle.

12. A method for securing a motorcycle to a surface, comprising:

a. attaching to the surface a base assembly including a base plate, a pair of eccentric pivot support brackets attached to the base plate, and an eccentric pivot disk rotatably mounted on each eccentric pivot support bracket and having a pin assembly support aperture formed therethrough at a position thereon displaced from a rotational axis of the eccentric pivot disk such that a distance of the pin assembly aperture from the surface is adjustable by rotation of the eccentric pivot disk;

b. attaching to the motorcycle a pin bracket having a plurality of pin bracket pin supports attached thereto, wherein each pin bracket pin support includes an aperture formed therethrough;

c. rotating the eccentric pivot disks to adjust the position of the pin assembly support apertures to a distance from the surface corresponding to a distance of the aperture formed through the pin bracket pin support from the surface when the motorcycle is positioned on the surface;

d. positioning the motorcycle on the surface over the base plate such that the pin bracket is positioned between the eccentric pivot support brackets and such that the pin assembly support apertures and the aperture formed through the pin bracket pin support are aligned; and e. inserting a pin assembly through the aligned pin assembly support apertures and the aperture formed through the pin bracket pin support to thereby attach the pin bracket to the base assembly.

13. The method of claim 12 wherein the surface is a bed of a trailer.

14. The method of claim 12 wherein the base plate includes a plurality of apertures formed therethrough and wherein the base assembly is attached to the surface using fasteners extending through the apertures formed in the base plate and into the surface.

15. The method of claim 12 wherein the pin assembly includes a pin lock aperture formed through a pin of the pin assembly and comprising additionally locking the pin assembly in place when the pin is received in the pin assembly support apertures by placing a pin lock structure in the pin lock aperture.

16. The method of claim 12 comprising additionally locking a rotational position of the eccentric pivot disks after rotating the eccentric pivot disks.

17. The method of claim 16 wherein the eccentric pivot disks include a plurality of locking apertures formed extending through the eccentric pivot disks at the periphery thereof and wherein the eccentric pivot support brackets include at least one corresponding locking aperture formed therein and wherein locking the rotational position of the eccentric pivot disk includes extending a fastener through a selected one of the locking apertures formed in the eccentric pivot disk into the corresponding locking aperture formed in the eccentric pivot support bracket.

* * * * *